No. 613,265. Patented Nov. 1, 1898.
T. GOHLKE.
MACHINE FOR CUTTING OVALS AND IRREGULAR FORMS FROM SHEET METAL.
(Application filed June 24, 1897. Renewed Apr. 6, 1898.)
(No Model.) 2 Sheets—Sheet 1.
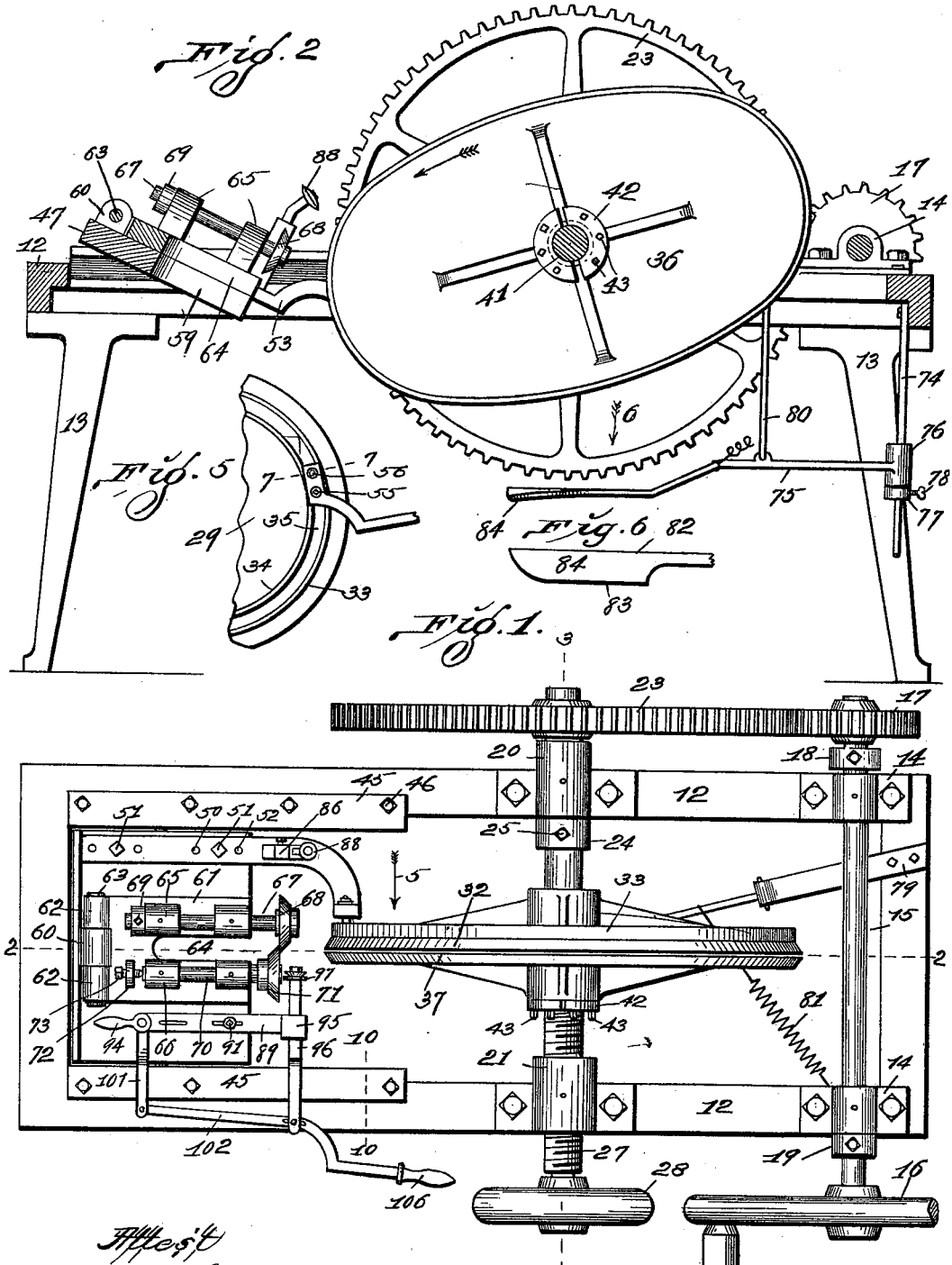

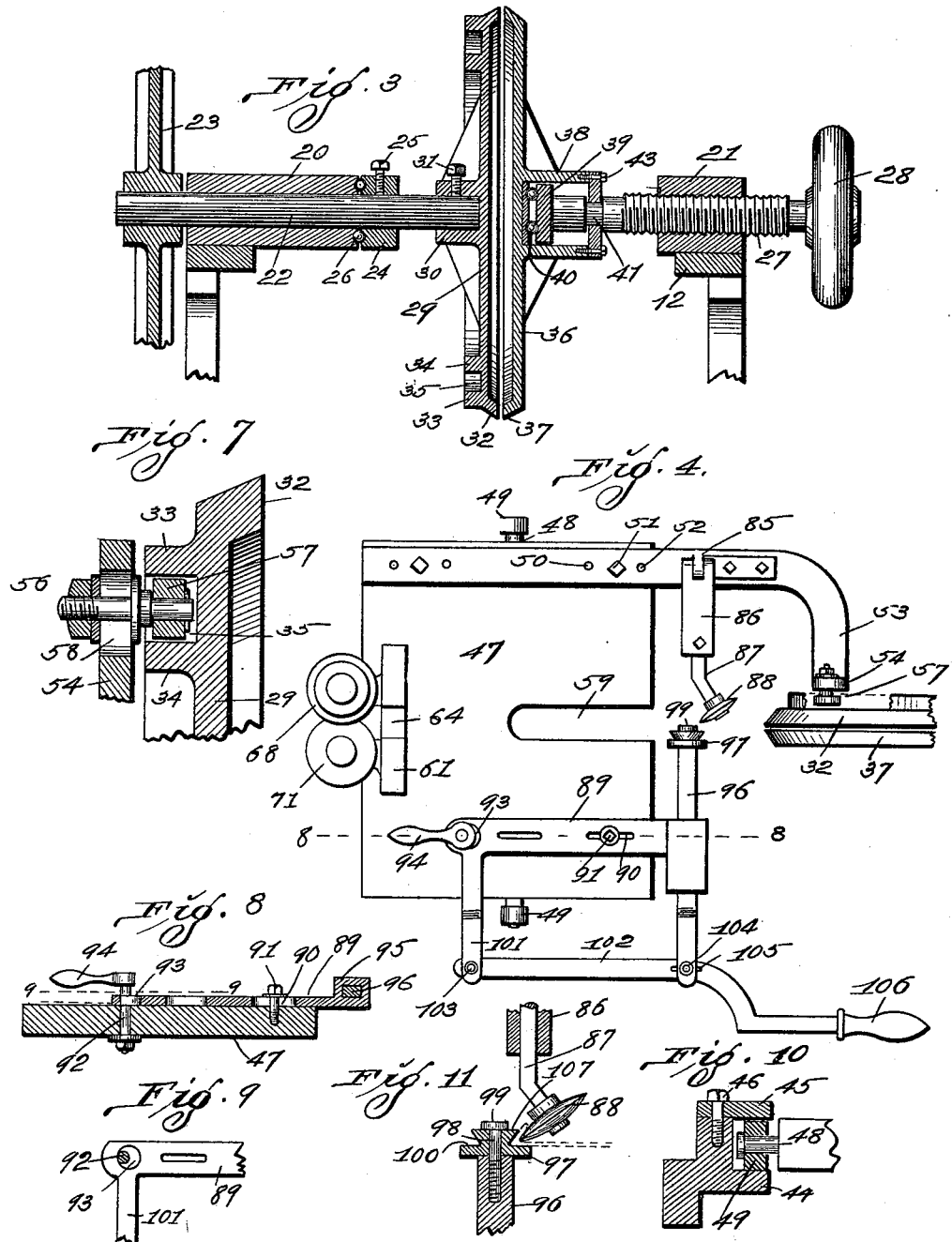

UNITED STATES PATENT OFFICE.

THEODORE GOHLKE, OF ST. LOUIS, MISSOURI.

MACHINE FOR CUTTING OVALS AND IRREGULAR FORMS FROM SHEET METAL.

SPECIFICATION forming part of Letters Patent No. 613,265, dated November 1, 1898.

Application filed June 24, 1897. Renewed April 6, 1898. Serial No. 676,705. (No model.)

*To all whom it may concern:*

Be it known that I, THEODORE GOHLKE, of the city of St. Louis, State of Missouri, have invented certain new and useful Improvements in Machines for Cutting Ovals and Irregular Forms from Sheet Metal, of which the following is a full, clear, and exact description, reference being had to the accompanying drawings, forming a part thereof.

My invention relates to machines for cutting ovals and irregular forms from sheet metal; and it consists in the novel construction, combination, and arrangement of parts hereinafter shown, described, and claimed.

Figure 1 is a top plan view of a machine constructed in accordance with the principles of my invention. Fig. 2 is a vertical sectional view taken longitudinally of the machine and approximately on the line 2 2 of Fig. 1. Fig. 3 is a vertical sectional view taken transversely of the machine and approximately on the line 3 3 of Fig. 1. Fig. 4 is an enlarged detail plan view analogous to Fig. 1 and illustrating the operation of the machine. Fig. 5 is a view in elevation of the part seen looking in the direction indicated by the arrow 5 in Fig. 1. Fig. 6 is a plan view of the free end of the gage-bar. Fig. 7 is a horizontal sectional view taken approximately on the line 7 7 of Fig. 5. Fig. 8 is a vertical sectional view taken approximately on the line 8 8 of Fig. 4. Fig. 9 is a horizontal sectional view taken approximately on the line 9 9 of Fig. 8. Fig. 10 is a vertical sectional view taken approximately on the line 10 10 of Fig. 1. Fig. 11 is a horizontal sectional view of the crimping device shown in Fig. 4.

My machine is intended especially for cutting stove tops and bottoms, boiler-bottoms, and other irregular forms from sheet metal, and in the construction of a machine for this purpose in accordance with the principles of my invention I employ the rectangular frame 12, mounted in a horizontal position upon suitable legs 13. Mounted upon the frame 12 near one of its ends are alined bearings 14, and the shaft 15 is mounted in said bearings transversely of the machine. The crank-wheel 16 is mounted upon one end of said shaft and outside of the frame, and the gear-wheel 17 is mounted upon the opposite end of said shaft and outside of the frame, and said shaft is held from endwise motion and is adjustable in position by means of the collars 18 and 19, which collars are secured to the shaft by means of set-screws. The bearings 20 and 21 are mounted in transverse alinement upon the frame 12 and near the center of said frame. The shaft 22 is rotatably mounted in the bearing 20 and extends transversely of the machine to a point near its center. The large gear-wheel 23 is fixed upon the outer end of the shaft 22 and meshes with the gear 17. The collar 24 is adjustably mounted upon the inner end of the shaft 22 and is secured in position by means of the set-screw 25. An annular groove is formed in the inner face of the bearing 20, concentric to the shaft 22, and a similar groove is formed in the outer face of the collar 24, and the balls 26 are placed in said grooves to form an antifriction connection between the collar 24 and the bearing 20.

The bearing 21 is interiorly screw-threaded, and a screw-threaded shaft 27 is mounted in said bearing. A hand-wheel 28 is fixed upon the outer end of said shaft 27 for operating the same. The plate 29 is designed to be mounted in position transversely of the shafts 22 and 27 and between said shafts and has the hollow hub 30 projecting from its center, in which the inner end of the shaft 22 is secured by means of the set-screw 31. A flange 32 projects inwardly from the edge of the plate 29, and the flanges 33 and 34 project outwardly from said plate and near its edge. The flanges 33 and 34 are parallel with each other—one inside of the other—thus forming a cam-slot 35 between said flanges. The plate 36 is of substantially the same size and shape as the plate 29 and has the flange 37 projecting inwardly from its edge in opposition to the flange 32. The hollow hub 38 projects from the center of the plate 36 and is somewhat larger than the hub 30. An annular groove is formed in the face of the plate 36 inside of the hub 38 and concentric with the shaft 27. A disk 39 is fixed upon the inner end of the shaft 27 and has an annular groove in its inner face corresponding to the groove in the face of the plate 36, and the balls 40 are placed between the plate 39 and the plate 36 in said grooves to form an antifriction connection between the plate 36 and the shaft 27. An annular recess 41 is formed around the shaft 27 near its inner end, and the segmental plates or split rings 42 are placed in position with their inner edges engaging in said recesses 41, and said plates are secured in position by means of the lag-screws 43, inserted through said plates and screw-seated in the hub 38. The plates 29 and 36 form a clamp between which the sheet of metal is held while it is being cut, and said clamp is opened and closed by the manual operation of the hand-wheel 28.

The plan of the outer edges of the flanges 32 and 37, carried by the plates 29 and 36, conform substantially to the plan of the pattern to be cut, and in changing from one pattern to another it is necessary to change said plates.

At the end of the frame 12 opposite the end upon which the shaft 15 is mounted are inwardly-projecting alined flanges 44, one of which is shown in Fig. 10, and above said flanges and parallel therewith the plates 45 are mounted and secured in position by means of the lag-screws 46, which screws are inserted through said plates and screw-seated in the frame. The plate 47 is mounted between the side pieces of the frame, and stub-shafts 48 project laterally from said plate in alinement with each other, and the rollers 49, mounted upon said stub-shafts, operate between the flanges 44 and the plates 45, thus forming a sliding pivotal support for said plate 47. The bar 50 is mounted upon one edge of the plate 47 and secured in position by means of the lag-screws 51, which lag-screws are inserted through corresponding ones of the openings 52, formed in said bar 50. There are several of the openings 52 to provide an endwise adjustment for said bar 50, or, if preferred, longitudinally-extending slots may be substituted for said openings 52. The bar 50 extends some distance from the inner end of the plate 47, and then the portion 53 of said bar is bent inwardly to a point near the plate 29, and the portion 54 of said bar extends upwardly from the inner end of the portion 53 in a line at right angles to the face of the plate 47. The bolts or stub-shafts 55 and 56 are inserted through rollers 57 and are adjustably mounted in the slotted openings 58, formed in the portions 54 of the bar 50, and said rollers 57 operate in the cam-slot 35 between the flanges 33 and 34, carried by the plate 29.

A slot 59 is formed in the plate 47 and from the inner side of said plate, and said slot 59 is in longitudinal alinement with the opening between the flanges 32 and 37. An ear 60 extends upwardly from the outer end of the plate 47 in alinement with said slot 59, and an opening or bearing through said ear extends in a horizontal position transversely of the machine. The plate 61 has the ears 62 formed at its outer end, and the ear 60 is placed between said ears 62, and the pin 63 is inserted through said ears and forms a hinge connection between the plates 47 and 61. A slot 64 is formed in the inner end of the plate 61 and registers with the slot 59. A pair of posts 65 extends upwardly from the plate 61 upon one side of the slot 64, and a similar pair of posts 66 extends upwardly from said plate 61 upon the opposite side of said slot 64. The shaft 67 is mounted in the upper ends of the posts 65. Upon the inner end of the shaft 67 is a disk cutter 68, and upon the opposite end of said shaft from said cutter is a collar 69, held in position by a set-screw. The shaft 70 is mounted in the upper ends of the posts 66 and in position parallel with the shaft 67, and upon the inner end of said shaft 70 is a disk cutter 71, mating with the cutter 68. The collar 69 holds the shaft 67 from sliding inwardly, and the disk 71 engages the outer face of the disk 68. An ear 72 projects upwardly from the plate 61, near to the outer one of the posts 66, and a set-screw 73 is inserted through said ear 72, with its point in engagement with the outer end of the shaft 70, and the meeting and overlapping edges of the cutters 68 and 70 are held together by the adjustment of said set-screw 73. The bar or rod 74 extends downwardly from the end of the frame and in longitudinal alinement with the clamp, as shown in Fig. 2.

The gage-bar 75 is attached to the head 76, which head is slidingly mounted upon the bar 74 and is held adjustably in position by means of the collar 77, carrying the set-screw 78. The head 76 fits loosely upon the bar 74, as required, to allow the gage-bar 75 to swing freely in a horizontal line. The bar 79 is attached to the upper face of the end piece of the frame and extends toward the clamp, and a rod 80 extends downwardly from the end of the bar 79 and acts as a stop to limit the motion of the gage-bar 75. A retractile coil-spring 81 is attached to the center of the bar 75 and is attached to the opposite side of the frame from the bar 79. The tension of the coil-spring 81 normally holds the gage-bar 75 against the rod 80, and when in this position the free end of said gage-bar is directly under the clamp. The free end of the gage-bar 75 is constructed as shown in Fig. 6 and has the straight edge 82, the curved edge 83, and the curved upper face 84.

When it is desired to cut a pattern of a certain width, the piece of sheet metal is placed in the clamp, the gage is set until the face 84 is the desired distance from the center of the shaft 27, and then the clamp is tightened. When the clamp rotates, the corners of the sheet metal will strike the curved edge 83 and the curved face 84 and will cause the gage to spring out of the way of said corners. After a clamp of the desired pattern has been placed in the machine and the sheet of metal has been placed in the clamp the crank-wheel 16 is manually operated to rotate the clamp in the direction indicated by the arrow in Fig.

2, thus bringing the sheet of metal downwardly upon the cutting-disks 68 and 71. As the clamp is rotated the rollers 57 follow the cam-slot 35 and the plate 47 is reciprocated and at the same time rocked as required to hold the cutters in position to follow the line of the pattern upon the sheet metal. By adjusting the bar 50 upon the plate 47, and thus increasing or decreasing the distance between the cutters and the clamp, different sizes may be cut from the same pattern.

I will now describe the mechanism and manipulations whereby flanges are turned upon the edges of the pattern after they are cut.

The plate 61 is turned upwardly on its hinge, as shown in Fig. 4. The post 85 is attached to the bar 50 at a point a short distance inside of the inner edge of the plate 47 and projects upwardly from said bar. The bar 86 has one of its ends bifurcated to receive the upper end of the post 85, and a pin passes through said bifurcated end of said bar 86 and through said post 85, as required to form a hinge connection to allow the free end of said bar 86 to swing from a horizontal position to a vertical position. An arm 87 extends inwardly from the free end of said bar 86, and upon the inner end of said arm 87 is formed a spindle upon which the disk 88 is rotatably mounted, and said disk 88 is set at an angle of approximately thirty degrees relative to a line extending longitudinally of the machine. The bar 89 is placed upon the plate 47 and has the longitudinally-extending slot 90 formed near its inner end, through which the lag-screw 91 is inserted, said lag-screw being screw-seated in the plate 47 and forming a sliding connection between said plate 47 and said bar 89. A short shaft 92 is mounted vertically through the plate 47, and an eccentric 93 is fixed upon said shaft and rests upon the upper face of said plate 47, and in the outer end of the bar 89 is a circular opening in which said eccentric 93 operates. Upon the upper end of the shaft 92 is a handle 94 for rotating said shaft, and the bar 89 is reciprocated by the operation of said handle and the line of said reciprocation is longitudinally of the machine. Attached to the inner end of the bar 89 is a square or rectangular block 95, and a square or rectangular opening is formed through said block on a line transversely of the machine, and the bar 96 is slidingly mounted in said opening. A disk 97 is placed in position against the inner end of the bar 96, and the bolt 98, having the circular head 99, is inserted through said disk 97 and screw-seated in the end of said bar 96, as shown in Fig. 11. The disk 97 has a V-shaped groove 100 formed in its periphery, one wall of said groove being at right angles to the axis of said disk, and said disk is in position to be engaged by the disk 88. The end of the bar 96 opposite the end to which the disk 97 is attached is bent upwardly and extends outwardly above the side piece of the frame 12, as shown in Fig. 2, and an arm 101 is formed integral with the end of the bar 89 opposite the end to which the block 95 is attached, and said bar 101 extends outwardly and is bent upwardly in a line parallel with the outer end of the bar 96, and a shifting lever 102 is pivotally attached to the outer end of said arm 101 by means of the pin 103, and said lever is slidingly attached to the outer end of said bar 96 by means of the pin 104 operating in the longitudinally-extending slot 105, and a handle 106 is formed upon the free end of said shifting lever for manually operating the same. The disk 97 operates directly inside or near the inner faces of the cutters 68 and 71.

When it is desired to turn a flange on a pattern which has been cut to the desired shape, the handle 106 is operated to slide the bar 96 inwardly until the inner face 107 is in longitudinal alinement with the line of the plate to be crimped. The edge of the disk 88 will engage upon the opposite side of the plate from the disk 97, and a right-angled flange will be turned upon said plate, said flange being formed in the right-angled corner between the periphery of the bolt-head 99 and the face 107 of the disk 97, said plate being forced into said corner by the disk 88. When it is desired to turn the flange inwardly to an angle of from thirty to forty-five degrees relative to the body of the plate, the handle 94 is operated to slide the bar 89 outwardly, thus allowing the disk 88 to enter the V-shaped groove 100 of the disk 97. The edge of the plate is then forced between said disks 88 and 97, and the edge of the disk 88 presses the plate into the V-shaped groove 100.

I claim—

1. In a device of the class described, a rotating clamp, a cam-slot formed in the outer face of one of the plates forming said clamp and serving as a pattern, a plate pivotally and slidingly mounted, a frame hinged to said plate, cutters carried by said frame, an arm adjustably attached to said plate, and rollers mounted upon one end of said arm and engaging in said cam-slot, substantially as specified.

2. In a device of the class described, the bearings 20 and 21 mounted in transverse alinement, the bearing 21 being interiorly screw-threaded, the shaft 22 rotatably mounted in the bearing 20, the collar 24 mounted upon the shaft 22 inside of the bearing 20, ball-bearings between said collar and said bearing, the screw-threaded shaft 27 screw-seated in the bearing 21, a clamping-plate mounted upon the inner end of the shaft 22, flanges projecting outwardly from said clamping-plate and forming a cam-slot which serves as a pattern, a second clamping-plate rotatably mounted upon the inner end of the screw-threaded shaft 27 and in opposition to the first-mentioned clamping-plate, a ball-bearing between the inner end of said screw-threaded shaft and said second clamping-plate, and means of operating said shaft 22, substantially as specified.

3. In a device of the class described, a rotating clamp, cutters mounted adjacent to said clamp, a cam connection between said clamp and said cutters whereby said cutters are held in position relative to said clamp and a gage-bar 75 yieldingly and adjustably mounted below said clamp and having the curved edge 83 and the curved upper face 84, substantially as specified.

4. In a device of the class described, a suitable frame, a rotating clamp mounted between the side bars of said frame, the plate 47 slidingly and pivotally mounted between said side bars, a cam-slot formed in one of the outer faces of said rotating clamp, an arm adjustably attached to said plate 47 and extending toward said rotating clamp, rollers carried by the inner end of said arm and engaging in said cam-slot, the plate 61 hinged to the plate 47, posts extending upwardly from said plate 61, a pair of shafts mounted in parallel positions in bearings in the upper ends of said posts and cutting-disks upon the inner ends of said pair of shafts, substantially as specified.

5. In a device of the class described, a rotating clamp, a frame pivotally and slidingly mounted, a cam connection between said clamp and said frame, the bar 86 hinged to said frame, the arm 87 extending inwardly from the free end of said bar, the disk cutter 88 rotatably mounted upon the inner end of said arm at an angle of approximately thirty degrees relative to a line extending longitudinally of the machine, the bar 89 mounted to slide longitudinally of said frame, the eccentric 93 for operating said bar, the block 95 attached to the inner end of said bar, the bar 96 slidingly mounted through said block, the disk 97 rotatably mounted upon the inner end of said bar 96 and in position to engage the disk 88 and means of sliding said bar 96, substantially as specified.

6. In a device of the class described, the disk 97, the bolt 98 extending through said disk and having the circular head 99 and said disk 97 having a V-shaped groove 100 formed in its periphery, one wall of said groove being at right angles to the axis of the disk, and the disk 88 rotatably mounted in position to engage either in the V-shaped groove 100 or against the circular head 99, substantially as specified.

In testimony whereof I affix my signature in presence of two witnesses.

THEODORE GOHLKE.

Witnesses:
EDWARD E. LONGAN,
MAUD GRIFFIN.